(12) United States Patent
Halilah

(10) Patent No.: US 10,955,276 B2
(45) Date of Patent: Mar. 23, 2021

(54) WET GAS MEASURING DEVICE

(71) Applicant: Dynamic Flow Computers, Inc., Stafford, TX (US)

(72) Inventor: Sami O. Halilah, Stafford, TX (US)

(73) Assignee: DYNAMIC FLOW COMPUTERS, Stafford, TX (US)

(*) Notice: Subject to any disclaimer, the term of this patent is extended or adjusted under 35 U.S.C. 154(b) by 258 days.

(21) Appl. No.: 16/179,479

(22) Filed: Nov. 2, 2018

(65) Prior Publication Data
US 2019/0145808 A1    May 16, 2019

Related U.S. Application Data

(60) Provisional application No. 62/584,444, filed on Nov. 10, 2017.

(51) Int. Cl.
| | | |
|---|---|---|
| *G01F 1/88* | (2006.01) | |
| *G01F 1/40* | (2006.01) | |
| *G01F 1/74* | (2006.01) | |
| *E21B 47/06* | (2012.01) | |
| *E21B 47/10* | (2012.01) | |
| *G01F 15/02* | (2006.01) | |
| *G01F 1/36* | (2006.01) | |
| *G01F 25/00* | (2006.01) | |

(52) U.S. Cl.
CPC .............. *G01F 1/88* (2013.01); *E21B 47/06* (2013.01); *E21B 47/10* (2013.01); *G01F 1/363* (2013.01); *G01F 1/40* (2013.01); *G01F 1/74* (2013.01); *G01F 15/024* (2013.01); *G01F 25/0053* (2013.01)

(58) Field of Classification Search
CPC . G01F 1/88; G01F 1/40; G01F 15/024; G01F 1/363; G01F 1/74; G01F 25/0053; E21B 47/06; E21B 47/10
See application file for complete search history.

(56) References Cited

U.S. PATENT DOCUMENTS

| | | | | |
|---|---|---|---|---|
| 8,965,713 | B2* | 2/2015 | Skelding | G01F 1/663 |
| | | | | 702/45 |
| 9,435,199 | B1* | 9/2016 | Halilah | G01L 19/0092 |
| 2006/0053869 | A1* | 3/2006 | Gysling | G01N 22/00 |
| | | | | 73/61.44 |
| 2010/0138169 | A1* | 6/2010 | Johansen | G01F 1/7086 |
| | | | | 702/47 |

* cited by examiner

*Primary Examiner* — Mohamed Charioui

(57) ABSTRACT

A wet gas measuring system for calculating mass and volume of a gas and a liquid independently and simultaneously, having one or two hollow bodies, each hollow body having conical section mount interrupting the flow of a mixture of gas and liquid, a conical area ratio changer conditioning the gas to a uniform geometric shape; a protruding dome upstream of the first conical area ratio changer; a ram inlet bore through the dome unaffected by changes in gas viscosity, changes in Reynolds' number, changes in gas and liquid turbulence, and an upstream static pressure sensor; downstream pressure sensor for detecting a differential pressure; a temperature sensor; a ram velocity sensor with a processor and computer instructions for calculating velocity and mass of the gas using a detachable and re-attachable conical area ratio changer.

15 Claims, 12 Drawing Sheets

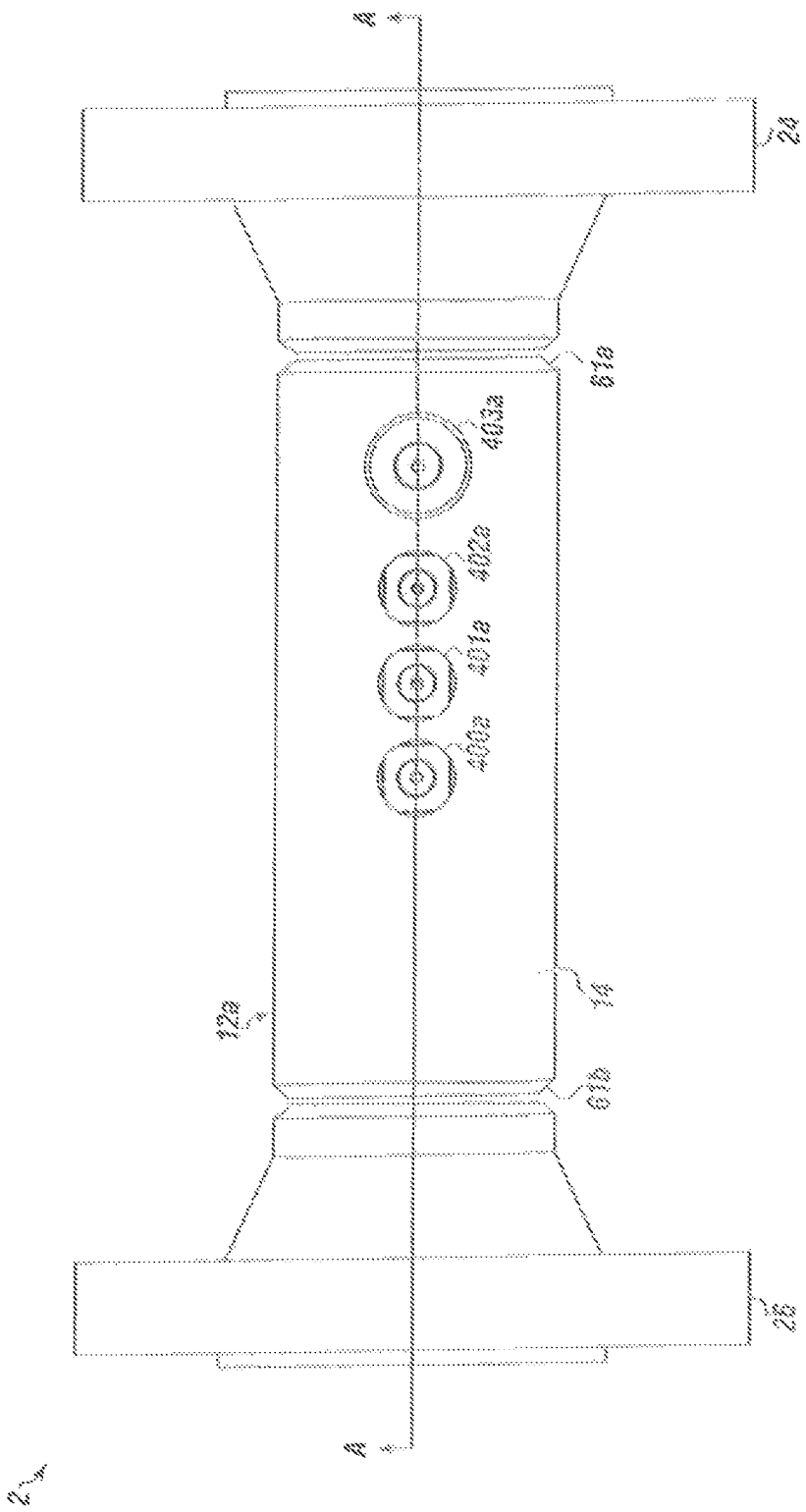

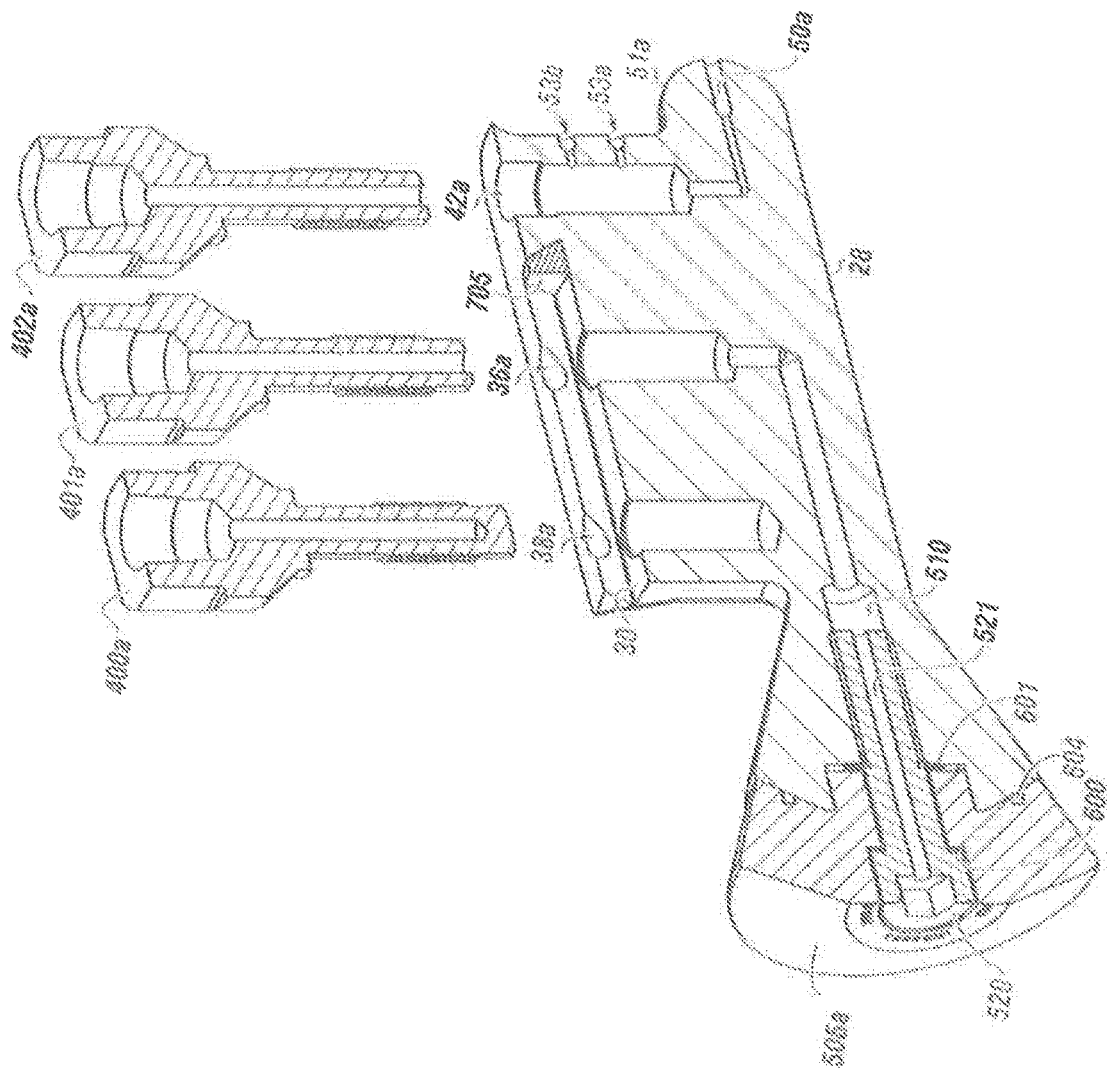

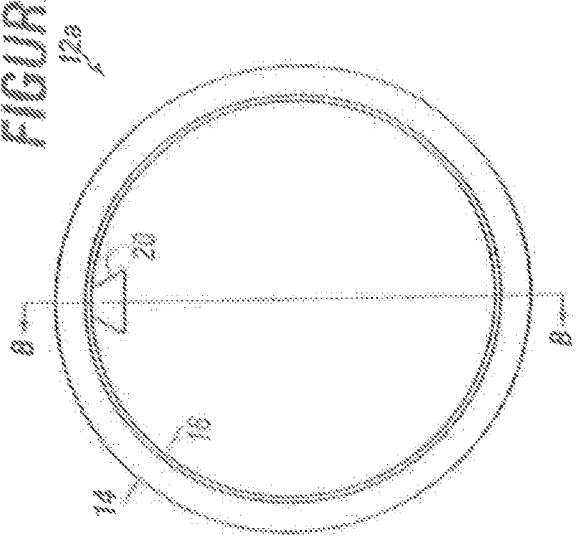

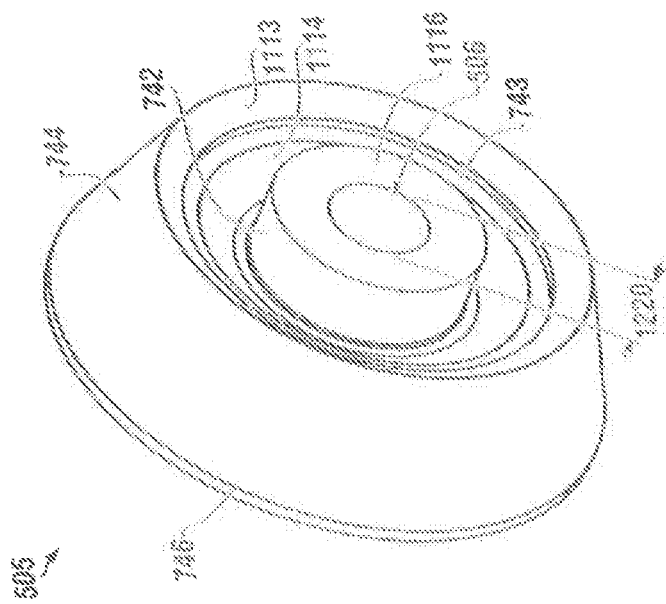
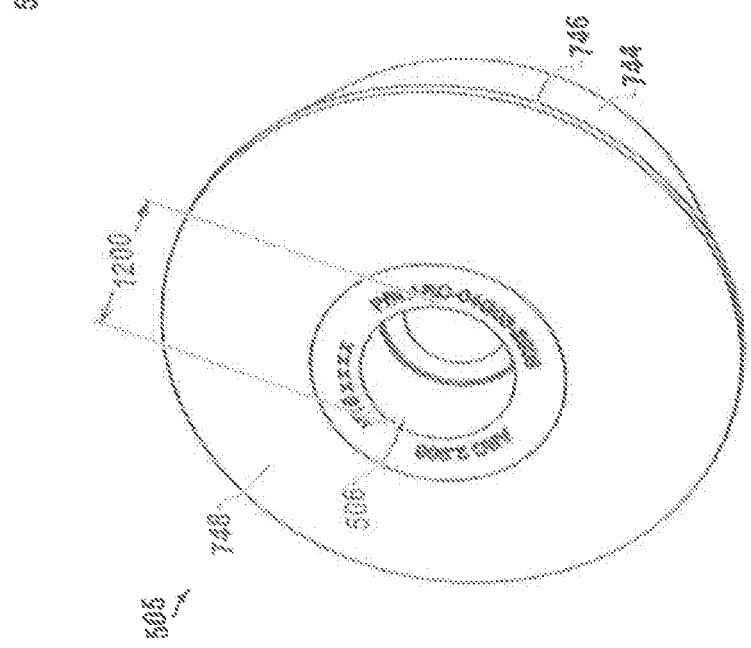
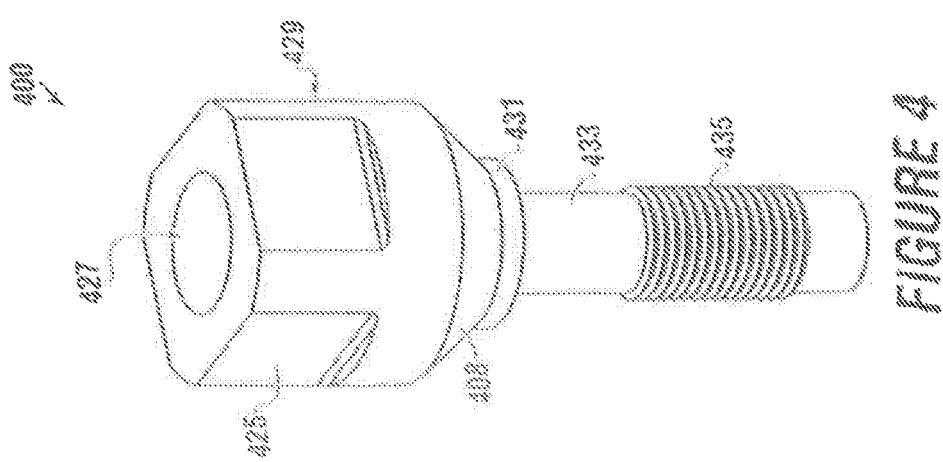
FIGURE 5B
FIGURE 5A
FIGURE 4

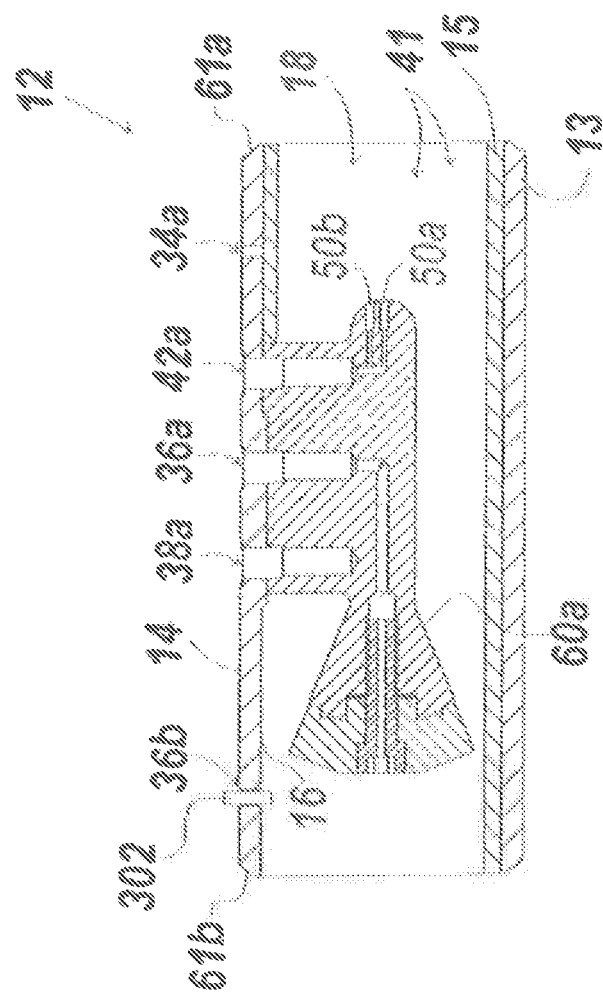

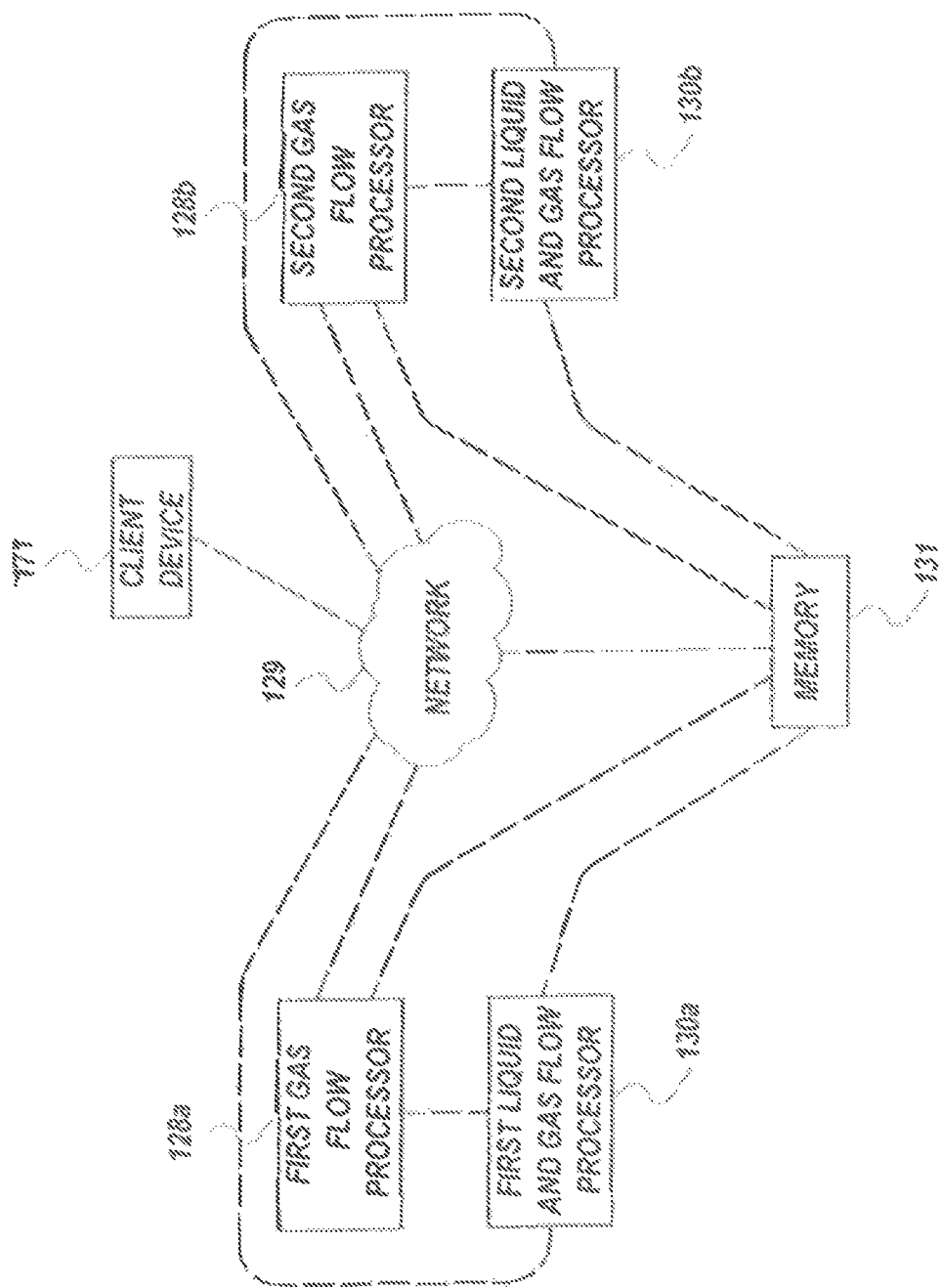

WET GAS MEASURING DEVICE

CROSS REFERENCE TO RELATED APPLICATIONS

The present application claims priority to and the benefit of U.S. Provisional Patent Application Ser. No. 62/584,444 filed on Nov. 10, 2017, entitled "IMPROVED WET GAS MEASURING DEVICE. This references is incorporated herein in their entirety.

FIELD

The present embodiment generally relates to an improved wet gas measuring device.

BACKGROUND

A need exists for an improved wet gas measuring device that can measure volume and mass individually for a gas and a liquid in a flowing stream.

A need exists for an improved rugged and reliable fluid measuring device to measure accurately and continuously flowing mass and volume for mixtures of fluid having liquid and gas coming from a wellbore.

A need exists for an improved fluid measuring device to continuously measure volume and mass for fluid mixtures coming from a pipeline.

A need exists for an improved fluid measuring device for geothermal fluids containing steam, and water.

A need exists for an improved fluid measuring device with a conical section mount that is self-centered and self-aligned.

A need exists for an improved fluid measuring device with a detachable and re-attachable area ratio changer allowing for replacement and maintenance without affecting the alignment of the conical section mount within the hollow body.

A need exists for an improved fluid measuring device that has a temperature port for recording temperature at an optimal location proximate the pressure measurement ports without disrupting fluid flow.

A need exists for an improved gas and liquid measuring device that conditions the gas in the center of a chamber, such as a ram port, enabling accurate volume and mass measurement of the gas in the center of the chamber.

A need exists for a centrally mounted ram port for measuring fluid velocity of the gas core section in order to calculate volume and mass for the gas core section.

The present embodiments meet these needs.

BRIEF DESCRIPTION OF THE DRAWINGS

The detailed description will be better understood in conjunction with the accompanying drawings as follows:

FIG. 1A depicts a perspective view of the wet gas measuring device.

FIG. 2B shows a cross sectional view of the conical section mount of FIG. 2A.

FIG. 3A is a cross sectional view of the hollow body of the wet gas measuring device.

FIG. 3B is a view of the hollow body along the cut lines B-B shown in FIG. 3A.

FIG. 4 is a perspective view of a tab of the plurality of tabs with a bore for receiving a sensor usable in the hollow body.

FIG. 5A depicts a front perspective view of the detachable and re-attachable conical area ratio changer.

FIG. 5B depicts a rear perspective view of the detachable and re-attachable conical area ratio changer.

FIG. 6 shows another embodiment of the wet gas measuring device.

FIG. 7 shows a liquid and gas flow processor with memory connected to a network and client device.

Figure 1B:
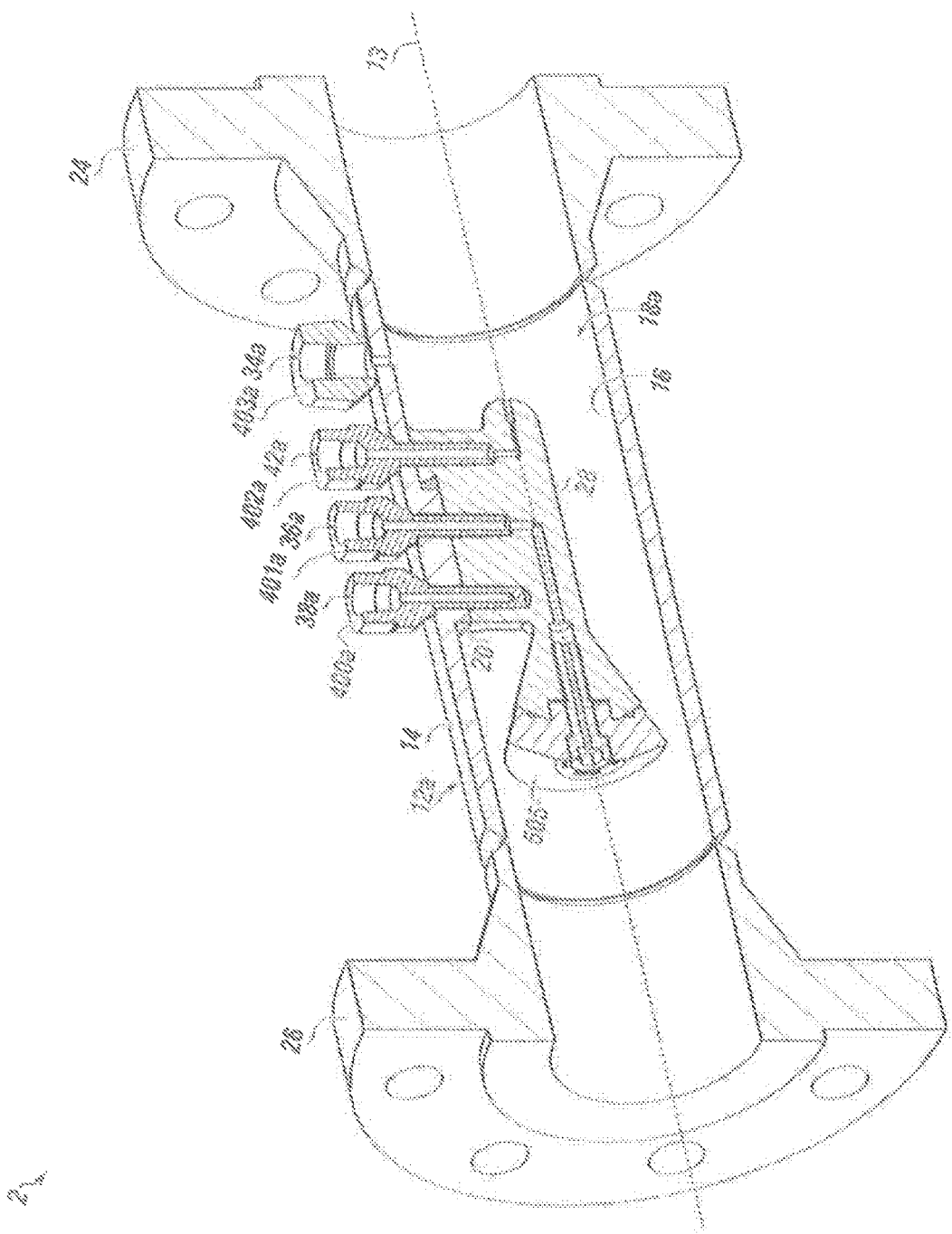
FIG. 1B is a cross sectional view of the wet gas measuring device of FIG. 1A.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The improved wet gas measuring device is designed to determine mixtures of gas and liquid mass and volume continuously in one body.

The improved wet gas measuring device is self-calibrating to correct and determine the volume and the mass for flowing gas and liquids.

The improved wet gas measuring device has no moving parts, which lengthens the operating life of the device.

The improved wet gas measuring device is self-centering.

The improved wet gas measuring device requires no welding into interior components of the fluid measuring device, which reduces metal deformity and generates machined high accuracy.

The improved wet gas measuring device can be made from different metals and metal thickness as well as different sizes to accommodate different corrosive fluids and higher volumes, which allows for higher pressure for downhole fluid measuring and metering.

The improved wet gas measuring device can be self-adapting to changing flow by means of changing the detachable and re-attachable conical area ratio changer (ARC).

In embodiments, components of the improved wet gas measuring device can be easily and quickly changed due to wear and tear without the need to change the entire fluid measuring device.

A feature of the embodiments is that the improved wet gas measuring device can accommodate high velocity of a mixture of fluids and accommodate both a low and a high Reynolds number. The improved wet gas measuring device can accommodate fluid flow as low as 100 pounds per hour to millions of pounds per hour for both liquid and gas combined.

The invention relates to an improved wet gas measuring device for calculating mass and volume of a gas and a liquid simultaneously.

A wet gas measuring system for calculating mass and volume of a gas and a liquid independently and simultaneously.

The wet gas measuring system has a first hollow body with a first chamber longitudinally disposed in the first hollow body;

The system has a first conical section mount centrally mounted in the first chamber interrupting the flow of a mixture of gas and liquid through the first hollow body.

The system has a first conical area ratio changer fluidly engaging the first conical section mount conditioning the gas to a uniform geometric shape in the first chamber.

A first protruding dome is formed on the first conical section mount upstream of the first conical area ratio changer.

A first ram inlet bore is formed in the first protruding dome.

The first ram inlet bore is unaffected by changes in gas viscosity, changes in Reynolds' number, changes in gas and liquid turbulence, and the first ram inlet bore is solely affected by velocity of the gas and density of the gas.

A first upstream static pressure sensor is mounted in a static upstream pressure port of the first hollow body for detecting pressure of the gas and liquid.

A first downstream pressure sensor is mounted in a downstream pressure port of the first chamber or mounted in a downstream pressure port centrally positioned in the first conical section for detecting a differential pressure across the conical section generated by the combined gas and liquid.

A first temperature sensor extends into a temperature port of the first hollow body detecting temperature of the gas and liquid in the first chamber.

A first ram velocity sensor is mounted in a ram velocity port for measuring pressure created by velocity of the gas at a center of the first chamber and calculating velocity and mass of the gas in the first chamber.

A first detachable and re-attachable conical area ratio changer fluidly communicating with the downstream pressure port is configured to provide a preset area for gas and liquid to flow through creating a differential pressure across the first conical section while conditioning gas flow through the first chamber.

A liquid and gas flow processor with memory is in communication with the first upstream static pressure sensor, the first downstream pressure sensor, first temperature sensor, and the first ram velocity sensor.

Computer instructions in the memory instruct the processor to calculate a flow rate across the first conical section of the mixture of gas and liquid in the first chamber and simultaneously calculate mass and volume of the mixture of gas and the liquid flowing through the first hollow body.

Computer instructions in the memory instruct the processor to calculate a flow rate of gas present in a center of the first hollow body.

Computer instructions in the memory instruct the processor to subtract mass and volume of the gas from the mass and volume of the mixture of gas and liquid in the first hollow body.

Computer instructions in the memory instruct the processor to perform a regression analysis to remove mass and volume of the liquid form the mass and volume of the mixture of gas and liquid.

In embodiments, a blind T is connected directly to the outlet of the first hollow body to stop measured fluid flow and redirect the measured fluid flow at an angle from 0 to 120 degrees and reset a flow pattern of the gas and liquids. The construction ensures resetting fluid flow memory.

In addition, a second hollow body is connected to the blind T.

The second hollow body has a second chamber longitudinally disposed in the second hollow body.

A second conical section mount is centrally mounted in the second chamber interrupting the flow of a mixture of gas and liquid through the second hollow body.

A second conical area ratio changer fluidly engages the second conical section mount conditioning the gas to a uniform geometric shape in the second chamber.

A second protruding dome is formed on the second conical section mount upstream of the second conical area ratio changer.

A second ram inlet bore is formed in the second protruding dome wherein the second ram inlet bore is unaffected by changes in gas viscosity, changes in Reynolds' number, changes in gas and liquid turbulence, and the second ram inlet bore is affected solely by velocity of the gas and density of the gas.

A second upstream static pressure sensor is mounted in a static upstream pressure port of the second hollow body for detecting pressure of the gas and liquid; a second downstream pressure sensor mounted in a downstream pressure port of the second chamber or mounted in a downstream pressure port centrally positioned in the second conical section for detecting a differential pressure across the conical section generated by the combined gas and liquid.

A second temperature sensor extends into a temperature port of the second hollow body detecting temperature of the gas and liquid in the second chamber.

A second ram velocity sensor is mounted in a ram velocity port for measuring pressure created by velocity of the gas at a center of the second chamber and calculating velocity and mass of the gas in the second chamber.

A second detachable and re-attachable conical area ratio changer fluidly communicates with the downstream pressure port and is configured to provide a preset area for gas and liquid to flow through creating a differential pressure across the second conical section while conditioning gas flow through the second chamber.

The second hollow body receives the liquid and gas from the blind T, transfers the liquid and gas vertically upward from the blind T against gravity at an angle from 0 degrees to 90 degrees and all the numbers in between to the first hollow body.

The processor connects to the sensors of the second hollow body at the same time the processor communicates with the sensors of the first hollow body.

The improved wet gas measuring device has a liquid and gas flow processor that contains memory. The liquid and gas flow processor is in simultaneous communication with the upstream static pressure sensor, downstream pressure sensor, temperature sensor, ram velocity sensor. In addition, the liquid and gas flow processor is simultaneously measuring both gas and liquid flowing through the chamber and calculating the mass and volume of the gas and liquid flowing through the hollow body. The liquid and gas flow processor simultaneously performs all of these functions.

In embodiments, the liquid and gas flow processor of the improved wet gas measuring device is in wireless communication with the sensors via a network providing further communication with a client device.

In further embodiments, the memory of the liquid and gas flow processor has instructions.

The instructions include instructions for instructing the liquid and gas flow processor to receive pressure readings from the upstream static pressure sensor and downstream pressure sensor and then calculate a total mass and volume of the combination of the gas and liquid.

The instructions include instructions for instructing the liquid and gas flow processor to use the calculated total mass and volume of the combination of the gas and the liquid with measured velocities from the ram velocity sensor to calculate a mass and volume of the gas.

The instructions also include instructions for instructing the liquid and gas processor to use the calculated mass and volume of the gas and calculated total mass and volume of the combination of the gas and liquid and perform a regression analysis to compute mass and volume of the liquid.

The following definitions shall be used herein:

The term "wet gas" refers to a device that contains both liquid and gas simultaneously.

Turning now to the Figures, FIG. 1A depicts a perspective view of a portion of the improved wet gas measuring device.

The improved wet gas measuring device 2 can have a first hollow body 12a for receiving and emitting a fluid.

The improved wet gas measuring device 2 can calculate density and velocity of the fluid flowing through the first hollow body 12a.

The first hollow body 12a is shown with an exterior surface 14. A first beveled surface 61a can be on at least one end of the first hollow body 12a. The first beveled surface 61a can be configured to connect in line with an upstream conduit 24.

A second beveled surface 61b can be on at least one end of the first hollow body, shown on the opposite end of the first hollow body 12a. The second beveled surface 61b can be configured to connect in line with a downstream conduit 26.

In embodiments, the improved wet gas measuring device can have a plurality of tabs 400a, 401a, 402a, and 403a.

In this embodiment, a temperature tab 400a can be mounted in a temperature port, a downstream pressure tab 401a can be mounted in a downstream pressure port, a ram velocity tab 402a can be mounted in a ram velocity port, and an upstream pressure tab 403a can be mounted in a static upstream pressure port.

In embodiments, each tab of the plurality of tabs can secure to and center a sensor in a port.

FIG. 1B is a cross sectional view of the wet gas measuring device of FIG. 1A along lines A-A.

The wet gas measuring device 2 can have a first longitudinal axis 13s and a first chamber 18a in the first hollow body 12a.

The first hollow body 12a is shown with an interior surface 16 and the exterior surface 14. The first hollow body can be positioned between the upstream conduit 24 and the downstream conduit 26.

A ledge 20 can be carved from or connected to the interior surface 16 of the first hollow body 12a.

A conical section mount 28a can be mounted to the ledge 20. In embodiments, the conical section mount 28a can be positioned centrally in the first hollow body 12a.

In embodiments, the conical section mount 28a can be concentrically disposed within the hollow body 12a.

A first detachable and re-attachable conical area ratio changer 505a can be connected to the first conical section mount 28a of the improved wet gas measuring device.

In embodiments, the improved wet gas measuring device can have plurality of ports 38a, 36a, 42a and 34a. In this embodiment, the plurality of ports are: a temperature port 38a, a downstream pressure port 36a, a ram velocity port 42a, and a static upstream pressure port 34a.

In embodiments, the plurality of ports 38a, 36a, 42a and 34a can be drilled through the first hollow body 12a. The plurality of ports can be aligned with each other.

In this embodiments, the plurality of tabs 400a, 401a, 402a, and 403a are shown with one tab inserted into one port of the plurality of ports 38a, 36a, 42a, and 34a.

This Figure depicts the temperature tab 400a e mounted in the temperature port 38a, the downstream pressure tab 401a mounted in the downstream pressure port 36a, the ram velocity tab 402a mounted in the ram velocity port 42a, and the upstream pressure tab 403a mounted in the static upstream pressure port 34a.

In embodiments, the plurality of tabs and the plurality of ports can be used to support sensors and can enable a plurality of sensors to sense fluid through each port of the plurality of ports all simultaneously.

Figure 1C:
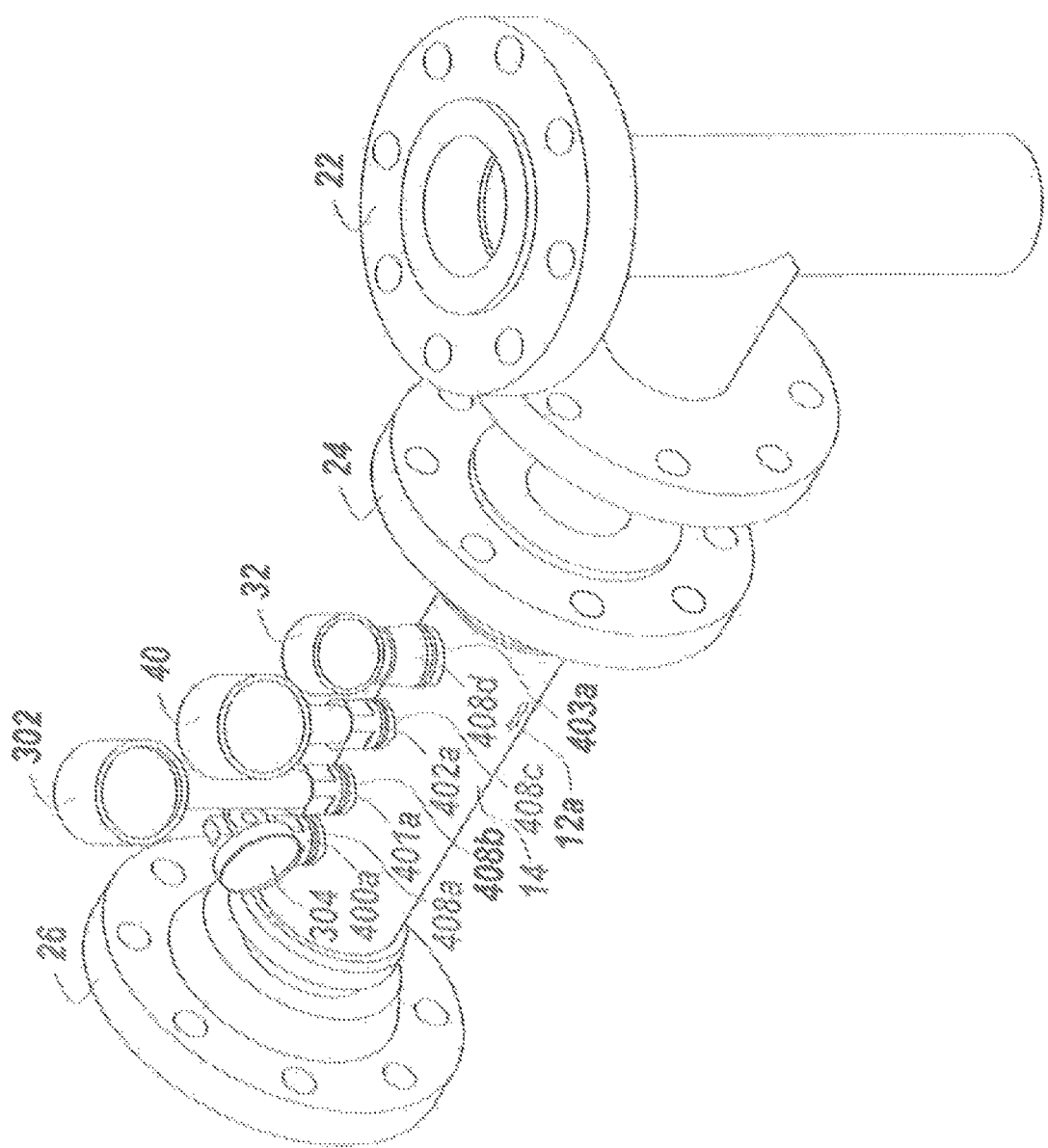
FIG. 1C is an assembled view of the wet gas measuring device of FIG. 1A.

FIG. 1C is an assembled view of the improved wet gas measuring device of FIG. 1A connected to a blind-T 22.

The improved wet gas measuring device 2 is shown with the first hollow body 12a having exterior surface 14a, which can be located between an upstream conduit 24 and a downstream conduit 26.

A plurality of first tabs 400a, 401a, 402a, and 403a can each have an angled surface 408a, 408b 408c, and 408d, respectively.

Each angled surface 408a-408d can be positioned between a neck section and a head portion of each tab.

In embodiments, each angled surface can support a weld. In embodiments, each weld can connect each tab to the hollow body.

In embodiments, each weld can provide a fluid and pressure seal to ensure no movement of the conical section mount on the ledge, which can be a self-centering dovetail ledge.

In embodiments, threads can be formed on a shaft of each tab of the plurality of tabs to provide an additional fluid and pressure seal.

In this embodiment, a plurality of first sensors 304a, 302a, 40a, and 32a are shown mounted in the plurality of first ports. In embodiments, the plurality of first sensors can extend in to the chamber of the first hollow body.

A temperature sensor 304a can be mounted in the temperature port on the temperature tab 400a.

A downstream pressure sensor 302a can be mounted in the downstream pressure port on the downstream pressure tab 401a.

A ram velocity sensor 40a can be mounted in the ram velocity port on the ram velocity tab 402a.

An upstream static pressure sensor 32a can be mounted in the static upstream pressure port on the upstream pressure tab 403a.

Figure 2A:
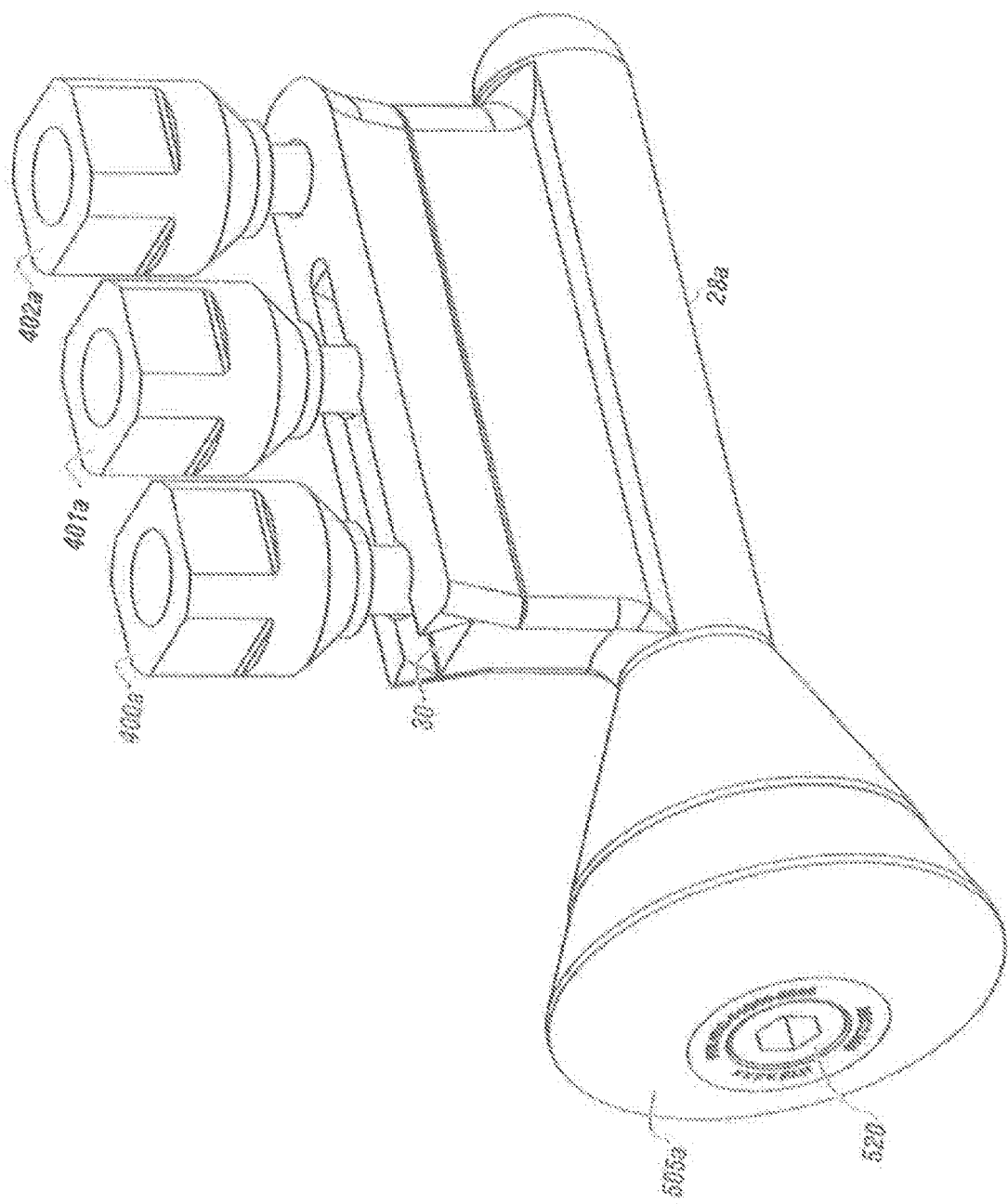
FIG. 2A depicts a perspective view of the conical section mount with the plurality of tabs.

FIG. 2A depicts a perspective view of the conical section mount with the plurality of tabs can be used in each of the first and second hollow bodies.

The plurality of first tabs 400a, 401a, and 402a are shown mounted in the plurality of ports, wherein the each tab of the plurality of tabs and each port of the plurality of ports can extend into the first conical section mount 28a.

For example, a first temperature sensor can mount to the first temperature tab 400a and into the first temperature port of the first hollow body.

In embodiments, the first temperature tab 400a can be hollow with a closed end.

Each of the other tabs can be hollow with an opened end. The first temperature port and the first temperature sensor can extend into the conical section mount 28a.

As another example, the first downstream pressure tab 401a is shown mounted in the first downstream pressure port. The first downstream pressure tab 401a and the downstream pressure port can extend into the first conical section mount 28a downstream from a first static upstream pressure port.

A first ram velocity sensor can be mounted in the first ram velocity port using the first ram velocity tab 402a.

The first ram velocity tab can extend upstream into the fluid flow opposite the direction of the fluid flow through the first hollow body. The first ram velocity tab can be mounted in the first ram velocity port and can penetrate to the interior surface of the first hollow body and can further extend into the first conical section mount 28a.

The conical section mount 28a can have a first mounting surface 30a for engaging the ledge of the first hollow body.

The first detachable and re-attachable conical area ratio changer 505a can be connected to the first conical section mount 28a and a first hollow fastener 520a is also shown.

FIG. 2B shows a cross sectional view of the conical section mount of FIG. 2A.

A first ram inlet bore 50a can be located in the first conical section mount 28a.

The first ram inlet bore can be fluidly communication or engagement with a first ram velocity port 42a to receive fluid pressure created by the velocity from a direction of fluid flow.

The first ram inlet bore 50a can be substantially parallel to the fluid flow through the first hollow body and the first ram velocity port 42a can be substantially perpendicular to the first ram inlet bore 50a.

The ram inlet bore 50a can penetrate to an interior surface of the first hollow body.

The conical section mount 28a can have a first protruding dome 51a, wherein the first protruding dome 51a can be centrally extending into the fluid flow upstream of the first conical section mount 28a.

The first protruding dome 51a can be configured to enable fluid velocity to be captured without the influence of the conical section mount, which can reduce fluid velocity.

With this device, a processor can be connected to the wet gas measuring device, which can allow a user or an operator to solve for density of the fluid entering the hollow body. For example, the processor can use Bernoulli's equation to solve for fluid density, which can enable fast and continuous determination of fluid density for multiple samples passing through the wet gas measuring device sequentially and continuously. This computation can be achieved by combining the upstream velocity with the downstream pressure of the flowing fluid using the multiple sensors and then computing the flowing density using Bernoulli's equation.

In embodiments, the first conical section mount 28a can be machine centered into the chamber in the first hollow body and to the ledge with a first stop 705a. The first stop 705a can hold the first conical section mount 28a to the ledge at a predetermined location in the first hollow body.

A first bore 510a can be used to assist in aligning and centering the detachable and re-attachable conical area ratio changer 505a to the first conical section mount 28a, which can be through a horizontal section of the wet gas measuring device. The first bore 510a can fluidly communicate with the first downstream pressure port 36a.

The hollow fastener 520 can be inserted into a hollow fastener bore 521, which can be fluidly connected though the first bore 510a. The hollow fastener 520 can align and center the first detachable and re-attachable conical area ratio changer 505a to the first conical section mount 28a.

The first detachable and re-attachable conical area ratio changer 505a is shown as a frustoconical annular disc with the bore 510 disposed therethrough.

A seal 604 can be disposed between the first detachable and re-attachable conical area ratio changer 505a and the first conical section mount 28a.

A lock washer 600 can secure the hollow fastener 520 to the first detachable and re-attachable conical area ratio changer 505a.

A retainer ring 601 can assist in holding the first detachable and re-attachable conical area ratio changer 505a to the hollow fastener 520.

In embodiments, a plurality of first ram velocity ports 53a and 53b can be fluidly connecting to the first ram inlet bore 50a and the first ram velocity port 42a simultaneously.

The plurality of first ram velocity ports 53a and 53b can be perpendicular to fluid flow through the first hollow body and parallel to fluid flow into the first ram inlet bore 50a.

The plurality of first tabs 400a, 401a and 402a are shown detached from the plurality of ports 38a, 36a and 42a of the first hollow body. The plurality of first tabs are shown in this Figures as temperature tab 400a, downstream pressure tab 401a, and ram velocity tab 402a.

The first mounting surface 30a of the first hollow body can enable the ledge to secure with the first conical section mount, which can also create a flush mount between the ledge and the first conical section mount 28a.

In embodiments, the improved wet gas measuring device can have additional ports for monitoring additional physical properties and are not limited to only the ports described herein.

FIG. 3A is a cross sectional view of the first hollow body of the improved wet gas measuring device.

The first hollow body 12a is shown with the exterior surface 14 and the interior surface 16.

The first ledge 20a can be mounted to the interior surface 16 of the first hollow body 12a.

FIG. 3B is a view of the hollow body along the cut lines B-B shown in FIG. 3A.

The first hollow body 12a is shown having a diameter 19, a first chamber 18a, a first beveled surface 61a, a second beveled surface 61b, an exterior surface 14, an interior surface 16 and the first ledge 20a.

In embodiments, the first ledge can be a self-centering dovetail ledge.

In embodiments, the first ledge can be carved from a solid metal pipe or an extra thick pipe for high pressure applications.

The plurality of first ports 38a, 36a, 42a, and 34a are shown as the temperature port 38a, the downstream pressure port 36, the ram velocity port 42a and the static upstream pressure port 34a.

In embodiments, the static upstream pressure port can be disposed through a sensor mount and can penetrate to the interior surface of the hollow body enabling sensing and recording of high pressure at the interior surface of the hollow body upstream from the conical section mount.

FIG. 4 is a perspective view of a tab of the plurality of tabs with a bore for receiving a sensor usable in each of the hollow bodies.

A tab 400a of the plurality of tabs can have a head portion 429, a tab bore 427 for receiving a sensor formed through the head portion 429, a shaft portion 433, threads 435 formed on the shaft portion 433, a neck section 431 connected between the shaft portion 433 and the head portion 429, and an angled surface 408 between the neck section and the head portion. The angled surface 408 can support a weld connecting the tab to exterior surface of the hollow body.

Each tab usable in each hollow body can have from two to four faces for assisting in positioning each tab in each hollow body. The faces 425 can be used to provide a mechanism to allow make-up with a sensor. The faces 425 can allow each tab to be torqued through the external surface of the hollow body.

FIG. 5A depicts a front perspective view of one of the detachable and re-attachable conical area ratio changers.

In operation, each detachable and re-attachable conical area ration changer 505a can have a central bore 506, which can receive a hollow fastener, which can form a flush fit securing each detachable and re-attachable conical area ratio changer 505a onto a conical section mount.

In embodiments, the detachable and re-attachable conical area ratio changer 505a can terminate in a flat surface 746. The surface 746 can be formed parallel to the interior surface of the hollow body to reduce wear of the first detachable and re-attachable conical area ratio changer 505a and promote unhindered fluid flow.

In embodiments, the flat surface 746 can be machined to maintain concentricity of the first detachable and re-attachable conical area ratio changer 505a with respect to the interior surface of the hollow body.

In embodiments, an axial dimension of the flat surface 746 can be optimized as a function of flow range, including operating conditions.

Due to the flat configuration of the flat surface 746, wear on the first detachable and re-attachable conical area ratio changer 505a can be reduced, thereby maintaining the accuracy of the data acquired.

Each detachable and re-attachable conical area ratio changer can also have a flat face 748 and a diameter passage 1200, which can engage a head of the hollow fastener.

Each detachable and re-attachable conical area ratio changer can have a beveled face 744 that can match a sloped surface of the conical section mount to provide obstruction to a flow stabilizer.

FIG. 5B depicts a rear perspective view of one of the detachable and re-attachable conical area ratio changers 505a.

Each detachable and re-attachable conical area ratio changer has a flat surface 746 and the beveled face 744.

Each detachable and re-attachable conical area ratio changer can have a plurality of mating surfaces, such as a first mating surface 1113, a second mating surface 1114, a third mating surface 742, and a fourth mating surface 1116.

In embodiments, at least one mating surface, or as shown here, the second mating surface 1114 can correspond to the mounting surface of the conical section mount, which can allow for self-aligned and self-centered installment of the detachable and re-attachable conical area ratio changer. The second mating surface 1114 and the mounting surface of the conical section mount can be formed with tight tolerances to maintain concentric consistency.

Each detachable and re-attachable conical area ratio changer can have a second diameter passage 1220 for engaging the hollow fastener.

FIG. 6 shows another embodiment of one of the hollow bodies of the improved wet gas measuring device.

The improved wet gas measuring device 2 can have the hollow body 12a with the exterior surface 14a, the interior surface 16, the first beveled surface 61a, the second beveled surface 61b and the chamber 18a.

In this embodiment, the conical section mount can be formed as a single piece unit. In embodiments, the single piece unit can be made of cast metal.

The plurality of ports 38a, 36a, 42a, 34a are shown. The plurality of ports are temperature port 38a, downstream pressure port 36a, ram velocity port 42a, and static upstream pressure port 34a respectively.

In embodiments, the first ram inlet bore 50a and a second ram inlet bore 50b can each fluidly engage the ram velocity port 42a to receive pressure generated by fluid impacting the ram inlet bore.

Element 41 is used to depicts pressure of the gas at a center of the hollow body.

Element 15 is depicting the liquid 15 as a film that is disposed annularly on the interior surface 16a of the chamber.

The outer walls 13 of the chamber 18a are shown.

The first conical section 60a centrally mounted between the inlet and the outlet interrupting the flow of the gas and liquid is shown inside the first hollow body 12a.

A downstream pressure sensor 302a can be mounted in the downstream pressure port 36b.

FIG. 7 shows a first liquid and gas flow processor 130a and a second liquid and gas flow processor 130b and a first gas flow processor 128a and a second gas flow processor 128b in communication with a memory 131, a network 129 and a client device 171.

In embodiments, the first and second liquid and gas flow processors 130a and 130b and the first and second gas flow processors are in a wireless communication with the sensors via a network 129 for further communication with a client device 171.

Figure 8A:
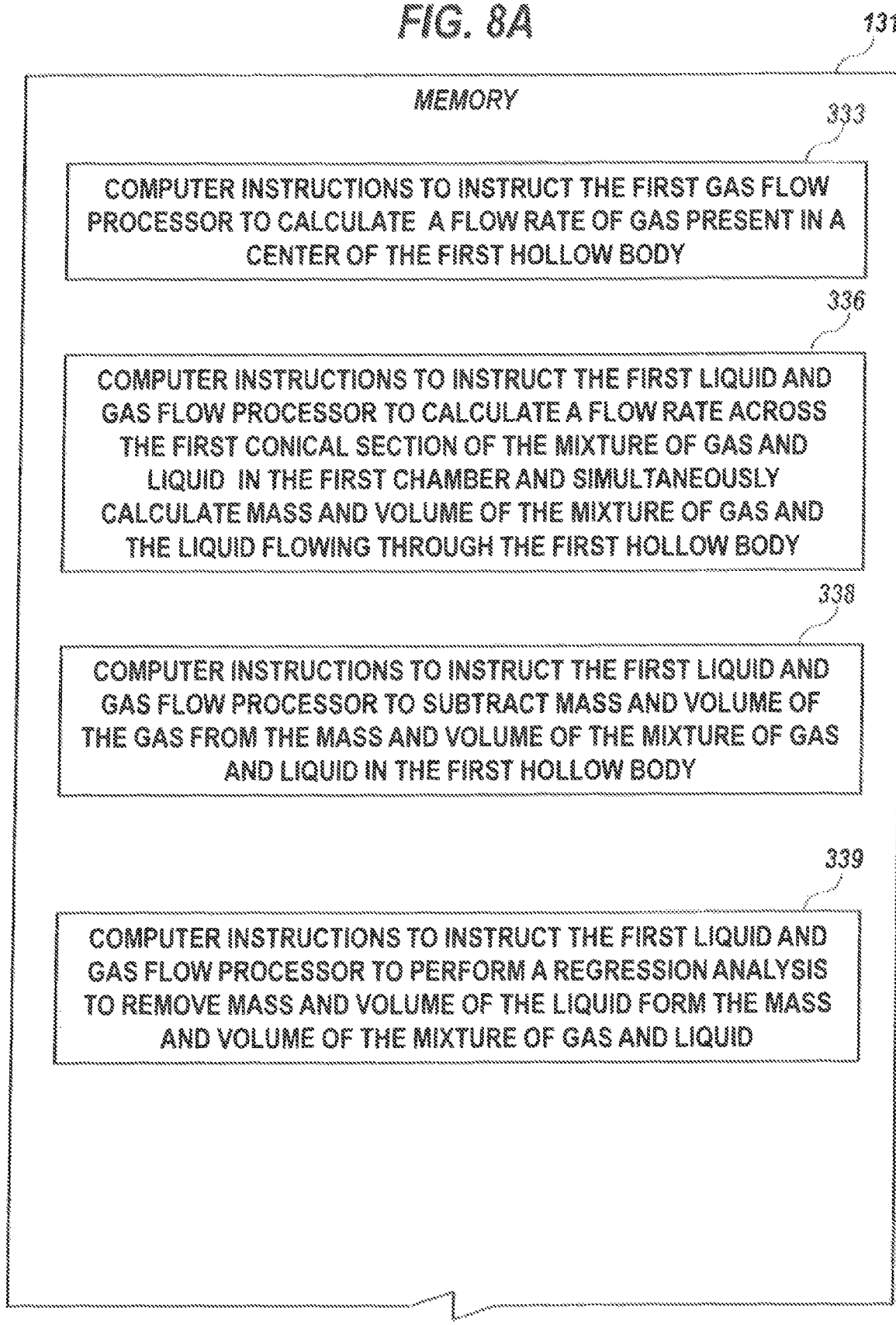
FIG. 8A-B depicts an embodiment of a dual wet gas measuring system.
Figure 8B:
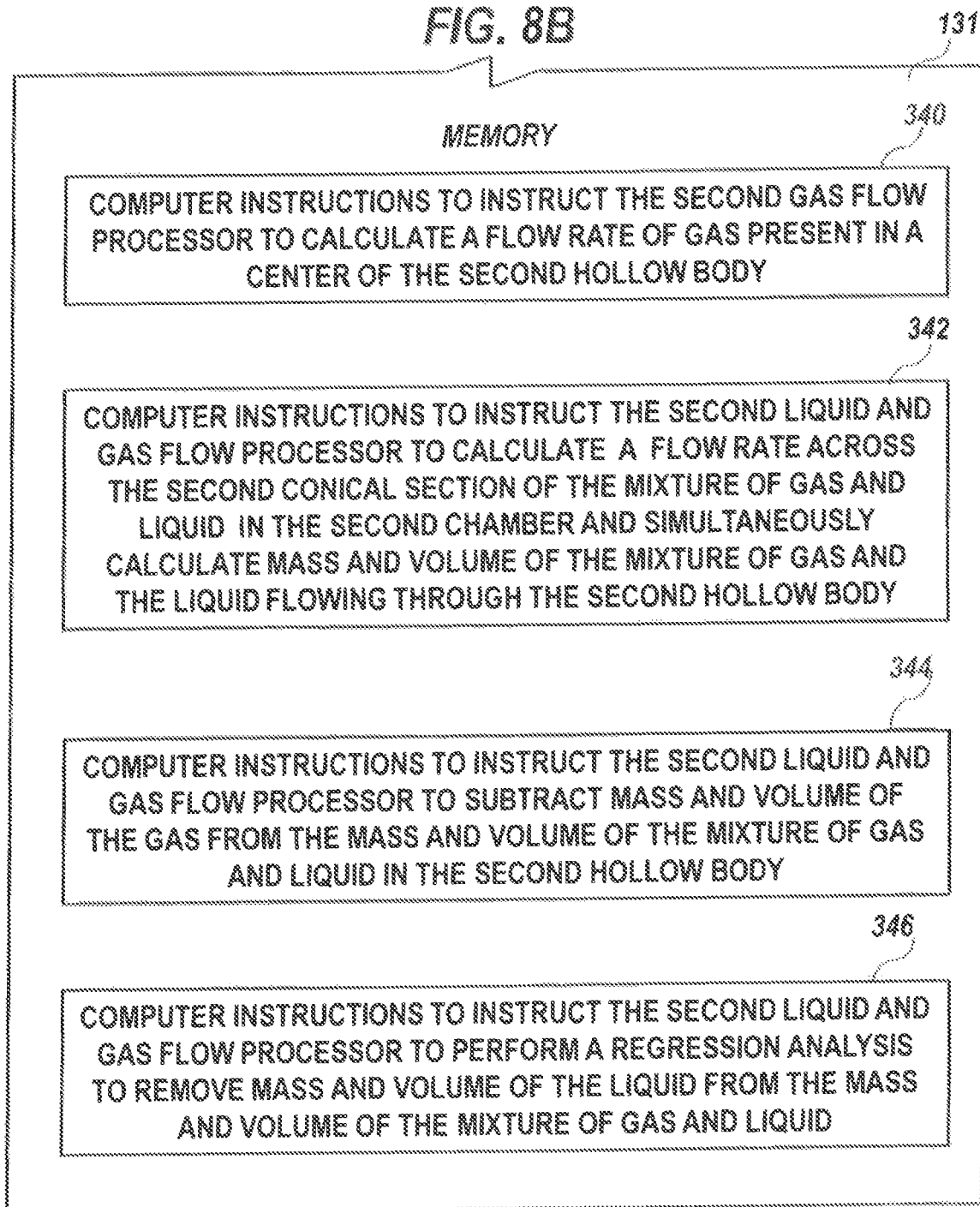

FIG. 8A-8B depict the memory according to one or more embodiments.

The liquid and gas flow processor 130 with memory 131 can be in communication with the upstream static pressure sensor, downstream pressure sensor, temperature sensor, ram velocity sensor and measuring both gas and liquid pressure flowing through the chamber and simultaneously calculating mass and volume of the gas and the liquid flowing through each hollow body.

The memory 133 can include computer instructions 333 to instruct the first gas flow processor to calculate a flow rate of gas present in a center of the first hollow body The memory 133 can include computer instructions 336 to instruct the first liquid and gas flow processor to calculate a flow rate across the first conical section of the mixture of gas and liquid in the first chamber and simultaneously calculate mass and volume of the mixture of gas and the liquid flowing through the first hollow body.

The memory 133 can include computer instructions 338 to instruct the first liquid and gas flow processor to subtract mass and volume of the gas from the mass and volume of the mixture of gas and liquid in the first hollow body.

The memory 133 can include computer instructions 339 to instruct the first liquid and gas flow processor to perform a regression analysis to remove mass and volume of the liquid from the mass and volume of the mixture of gas and liquid.

The memory 133 can include computer instructions 340 that instruct the second gas flow processor to calculate a flow rate of gas present in a center of the second hollow body.

The memory 133 can include computer instructions 342 that instruct the second liquid and gas flow processor to calculate a flow rate across the second conical section of the mixture of gas and liquid in the second chamber 18b and simultaneously calculate mass and volume of the mixture of gas and the liquid flowing through the second hollow body.

The memory 133 can include computer instructions 344 that instruct the second liquid and gas flow processor to subtract mass and volume of the gas from the mass and volume of the mixture of gas 8 and liquid 9 in the second hollow body.

The memory 133 can include computer instructions 346 that instruct the second liquid and gas flow processor to perform a regression analysis to remove mass and volume of the liquid from the mass and volume of the mixture of gas and liquid.

In embodiments, the liquid and gas flow processor 130 is in a wireless communication with the sensors via a network 129 for further communication with a client device 171.

Figure 9:
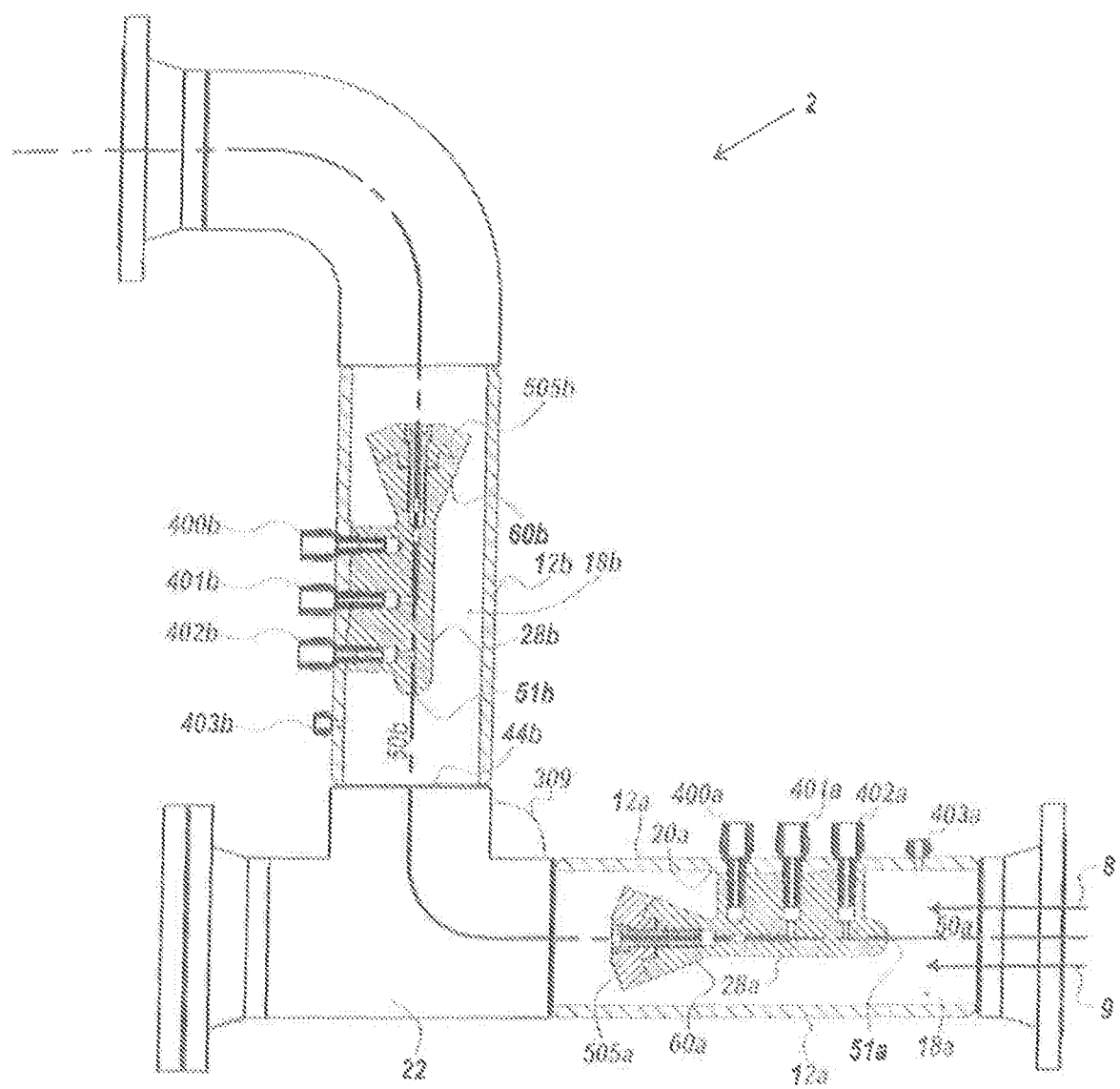
FIG. 9 depicts a wet gas measuring system for calculating mass and volume of a gas and a liquid independently and simultaneously.

FIG. 9 depicts a wet gas measuring system 2 for calculating mass and volume of a gas 8 and a liquid 9 independently and simultaneously.

The wet gas measuring system 2 has a first hollow body 12a and a second hollow body 12b fluidly connected together.

The first hollow body 12a can have a first chamber 18a longitudinally disposed in the first hollow body 12a.

A first conical section mount 28a is centrally mounted in the first chamber 18a interrupting the flow of a mixture of gas 8 and liquid 9 through the first hollow body 12a.

In embodiments, a first conical area ratio changer 505a can fluidly engage the first conical section mount 28a conditioning the gas 8 to a uniform geometric shape in the first chamber 18a.

A first protruding dome 51a is formed on the first conical section mount 28a upstream of the first conical area ratio changer 505a.

In embodiments, a first ram inlet bore 50a can be in the first protruding dome 51a, wherein the first ram inlet bore 50a is unaffected by changes in gas viscosity, changes in Reynolds' number, changes in gas and liquid turbulence, and the first ram inlet bore is solely affected by velocity of the gas 8 and density of the gas.

A first upstream static pressure sensor, supported by an upstream pressure tab 403a, can be mounted in a first static upstream pressure port 34a of the first hollow body 12a for detecting pressure of the gas and liquid.

A first downstream pressure sensor, supported by a first downstream pressure tab 401a, can be mounted in a first downstream pressure port 36a of the first chamber or mounted in a first downstream pressure port 36a centrally positioned in the first conical section 60 for detecting a differential pressure across the conical section generated by the combined gas 8 and liquid 9.

A first temperature sensor, supported by a first temperature tab 400a, can extend into a temperature port of the first hollow body 12a detecting temperature of the gas 8 and liquid 9 in the first chamber 18a.

A first ram velocity sensor, supported by a first ram velocity tab 402a, can be mounted in a ram velocity port for measuring pressure created by velocity of the gas 41 at a center of the first chamber and calculating velocity and mass of the gas 8 in the first chamber 12a.

In embodiments, a first detachable and re-attachable conical area ratio changer 505a can fluidly communicate with the downstream pressure port configured to provide a preset area for gas 8 and liquid 9 to flow through creating a differential pressure across the first conical section 60a while conditioning gas flow through the first chamber, and a liquid and gas flow processor with memory in communicating with the first upstream static pressure sensor, the first downstream pressure sensor, first temperature sensor, and the first ram velocity sensor.

In embodiments, a blind T 22 can be connected directly to the outlet of the first hollow body 12a to stop measured fluid flow and redirect the measured fluid flow at an angle from 0 to 120 degrees and reset a flow pattern of the gas 8 and liquids 9.

The second hollow body 12b contains a second chamber 18b longitudinally disposed in the second hollow body 12b.

A second conical section mount 28b can be centrally mounted in the second chamber 18b, interrupting the flow of a mixture of gas 8 and liquid 9 through the second hollow body 12b.

In embodiments, a second conical area ratio changer 505b can fluidly engage the second conical section mount 28b conditioning the gas 8 to a uniform geometric shape in the second chamber 18b.

A second protruding dome 51b can be formed on the second conical section mount 28b upstream of the second conical area ratio changer 505b.

In embodiments, a second ram inlet bore 50b can be in the second protruding dome 51b wherein the second ram inlet bore 50b is unaffected by changes in gas viscosity, changes in Reynolds' number, changes in gas and liquid turbulence, and the second ram inlet bore 50b is affected solely by velocity of the gas 8 and density of the gas.

A second upstream static pressure sensor 32b, supported by a second upstream pressure tab 403a, can be mounted in a second static upstream pressure port 34b of the second hollow body 12b for detecting pressure of the gas and liquid.

A second downstream pressure sensor, supported by a second downstream pressure tab 401b, can be mounted in a downstream pressure port of the second chamber or mounted in a downstream pressure port centrally positioned in the second conical section 60b for detecting a differential pressure across the conical section generated by the combined gas 8 and liquid 9.

A second temperature sensor, supported by a second temperature tab 400b, extending into a temperature port of the second hollow body 12b detecting temperature of the gas 8 and liquid 9 in the second chamber 18b.

A second ram velocity sensor, supported by a second ram velocity tab 402b, mounted in a ram velocity port for measuring pressure created by velocity of the gas at a center of the second chamber and calculating velocity and mass of the gas 8 in the second chamber 12a.

In embodiments, a second detachable and re-attachable conical area ratio changer 505b fluidly communicates with the downstream pressure port configured to provide a preset area for gas 8 and liquid 9 to flow through creating a differential pressure across the second conical section 60b while conditioning gas flow through the second chamber, wherein the second hollow body 12b receives the liquid and gas from the blind T 22, transferring the liquid and gas vertically upward from the blind T 22 against gravity at an angle 309 from 0 degrees to 90 degrees to the first hollow body.

The improved wet gas measuring device can have multiple elements, meters, and sensors in one body that can allow for solving for fluid density of the fluids being measured.

In embodiments, the improved wet gas measuring device can range in size from about ½ of an inch and up, such as 48 inches or larger, depending on flow serviced.

The wall thickness of the hollow body, the chamber, the wet gas measuring device, or combinations thereof, can be a thickness that can accommodate from standard low pressure to extremely high pressure in excess of 20,000 psi for high pressure production wells.

This embodiment evades issues relating to well sanding resulting in the complete damage to oil wells from drying up from oil and just water or gas production.

The components of the wet gas measuring device can be made from carbon steel, alloy steels, stainless steel, metal alloys, such as HASTELLORY®, metal alloys containing nickel and copper, such as MONEL®, or other materials as required to prevent attack by the fluid being passed through the wet gas measuring device.

In embodiments, the wet gas measuring device can have a hollow body that can be manufactured in different thicknesses and sizes, for example 0.5 inches to 48 inches, to meet required flow capacity and pressure rating, for example 1 psi to 15,000 psig.

In embodiments, the hollow body and conical section mount can be made to interference fit tolerances, which can allow a press fit between the two components to ensure concentricity and alignment within the hollow body.

In embodiments, the components can be press fitted together, such as by hydraulic pressing. In embodiments, the components can be heated and cooled in combination to allow mating of parts.

In embodiments, the upstream static pressure sensor extends into the hollow body upstream of each conical section.

In embodiments, the combination of a temperature sensor and a temperature port extends into each conical section to detect temperature of the hollow body.

In embodiments, each detachable and re-attachable conical area ratio changer is mounted to each conical section of a hollow body, and includes a central bore fluidly communicating with the upstream pressure port.

In embodiments, each hollow body is substantially cylindrical, and wherein the conical section mount is machine centered into each chamber, and wherein a bore is machine centered through each conical section mount.

Each detachable and re-attachable conical area ratio changer is a substantially frustoconical annular disc comprising a flat surface to reduce wear of the detachable and re-attachable conical area ratio changer and promote unhindered fluid flow.

In embodiments, each detachable and re-attachable conical area ratio changer is variable in size to be larger or smaller, to accommodate variations in fluid flow velocity while maintaining accuracy.

In embodiments, each hollow body and conical section mount is an integral single piece of cast metal.

In embodiments, each tab of the plurality of tabs is mounted in at least one port, wherein the plurality of tabs comprise a temperature tab mounted in each temperature port, a downstream pressure tab mounted in each downstream pressure ports, a ram velocity tab mounted in each ram velocity port, an upstream pressure tab mounted in each static upstream pressure port, and further wherein each tab of the plurality of tabs secures to and centers at a sensor in at a port.

In embodiments, each tab of the plurality of tabs has a head portion with a tab bore for receiving the at least one sensor formed through the head portion, a shaft portion, threads formed on the shaft portion, a neck section connected between the shaft portion and the head portion, and an angled surface between the neck section and the head portion, the angled surface for supporting a weld connecting each tab of the plurality of tabs to one of the hollow bodies.

The wet gas measuring system includes a plurality of lock washers. Each lock washer can secure a hollow fastener to one of the detachable and re-attachable conical area ratio changers and a plurality of retainer rings, each retainer ring constraining one of the detachable and re-attachable conical area ratio changers.

The wet gas measuring system includes a plurality of seals disposed between each detachable and re-attachable conical area ratio changer and each conical section of each hollow body.

Example 1

An improved wet gas measuring device for calculating mass and volume of a gas and a liquid simultaneously, having a hollow body that is 12 inches long.

The hollow body has a chamber with a 4 inch diameter surrounded by outer walls that are ½ inch thick.

The chamber has an interior surface that is smooth.

The hollow body has an inlet for receiving liquids and gases at the same time.

The hollow body has an outlet for transferring the liquids and gases which are at two different rates, such as liquefied natural gas, can be travelling at a rate of 1 meter per second and the gas, which could be natural gas vapor can be travelling at a velocity of 20 meters per section.

The inlet receives the liquids and gas from a blind T 22, against gravity while separating the two components and calculating both mass and volume of the two components.

The gas with very little density, pushes all liquid back against the interior surface of the outer walls, and the gas then occupies the core of the hollow body.

The hollow body supports a liquid annularly on the interior surface of the hollow chamber from liquids entering the hollow body.

At the same time, the hollow body creates a gas core section with a negligible amount of liquids such as less than 1% liquid by mass.

Inside the hollow body which is oriented vertically against gravity, is a conical section mount extending into the chamber from the outer walls interrupting flow of the gas core section and the liquid film through the hollow body.

A conical section flares from the conical section mount restricting the flow of the gas core section and the liquid film through the hollow body.

In this example, an upstream static pressure sensor and a downstream pressure sensor mounted in one more downstream pressure ports are used to calculate differential pressure. The upstream static pressure sensor is mounted in a static upstream pressure port of the hollow body. The upstream static pressure sensor extends into the chamber without entering the conical section and determines differential pressure before and after the conical mount.

A downstream pressure sensor is mounted in a downstream pressure port of the hollow body or mounted in a downstream pressure port of the conical section.

The differential pressure is proportional to the total mass of the gas core section and mass of the liquid film.

A temperature sensor is inserted into a temperature port of the hollow body, wherein both the temperature sensor and the temperature port extend into the conical section mount. The temperatures sensor for this example, can detect temperatures from 60 to 200 degrees Fahrenheit.

A ram velocity sensor is mounted in a ram velocity port for measuring velocity of the gas core section.

A ram inlet bore fluidly engaging the ram velocity port the ram inlet bore receiving pressure generated by the gas core section.

A differential pressure is calculated using the ram velocity sensor and the upstream static pressure sensor. This second differential pressure is proportional to the mass of the gas in the gas core section.

The liquid and gas flow processor with memory is connected to each of the sensors.

The memory includes instructions instructing the liquid and gas flow processor to receive pressure readings from the upstream static pressure sensor such as psi and the downstream pressure sensor such as 185 psi and calculates a total mass and volume of the combination of the gas core section and the liquid film such as a total mass of 10 kilograms per second and a total volume of liquid flow which can be computed at the end of the calculations.

The memory includes instructions instructing the liquid and gas flow processor to use upstream static pressure sensor with measured velocities from the ram velocity sensor such as a velocity of 43 meters per second to calculate a mass and volume of the gas core section. The density of the gas in this example is 44 kilograms per cubic meter and the density of the liquid in this example is 755 kilograms per cubic meter.

The memory includes instructions instructing the liquid and gas processor to use the calculated mass and volume of the gas core section and calculated total mass and volume of the combination of the gas core section and liquid film and a regression analysis to compute mass and volume of the liquid film, given the area inside the hollow body of 0.0073 $m^2$.

A detachable and re-attachable conical area ratio changer is mounted to the conical section. The detachable and re-attachable conical area ratio changer comprises a central bore fluidly communicating with the downstream pressure port.

A liquid and gas flow processor with memory is used in communication with the upstream static pressure sensor, downstream pressure sensor, temperature sensor, ram velocity sensor and measuring both gas and liquid flowing through the chamber simultaneously an calculating mass and volume of a gas and a liquid simultaneously flowing through the hollow body.

In embodiments, the wet gas measuring device has a pair of ram inlet bores, each formed in the conical section mount, and in parallel. Each ram inlet bore is connected to the ram velocity sensor.

In embodiments, the liquid and gas flow processor is in a wireless communication with the sensors via a network for further communication with a client device.

The network can be a global communication network, a local area network, a wide area network, a satellite network, a cellular network or combinations thereof.

The client device can be a computer with processor, memory and a display enabling bidirectional communication with the liquid and gas flow processor via the network.

In embodiments, the wet gas measuring device can be hollow body that is substantially cylindrical. The conical section mount can be machined and centered in the chamber. The bore of the conical section mount can also be formed by machining in the center of the conical section mount.

In embodiments, the wet gas measuring device has a mass and volume monitoring port, a viscosity port, and other ports for additional measurement of fluid and gas characteristics.

In embodiments, the wet gas measuring device has a detachable and re-attachable conical area ratio changer that is a substantially frustoconical annular disc with a flat surface to reduce wear of the detachable and re-attachable conical area ratio changer and promote unhindered fluid flow.

In embodiments, the wet gas measuring device has a detachable and re-attachable conical area ratio changer that is variable in size to be larger or smaller. This versatility in size enables the wet gas measuring device to accommodate variable fluid flow while maintaining high levels of accurate measurement, and simultaneously a volume of fluid flow (which can be increasing or decreasing depending on the size of the conical section mount).

In embodiments, the wet gas measuring device has a hollow body and the conical section mount that are a single integral unit of cast metal.

In embodiments, the wet gas measuring device has the conical section mount can have a protruding dome centrally extending into the fluid flow upstream of the conical section mount. The protruding dome can be configured to enable fluid velocity to be captured without the influence of the conical section mount.

In embodiments, the wet gas measuring device has a plurality of ram velocity ports connecting to the ram inlet bore and the ram velocity port. The plurality of ram velocity ports are formed perpendicular to the fluid flow in the hollow body and parallel to the ram inlet bore.

In embodiments, the wet gas measuring device has a lock washer securing the hollow fastener to the detachable and re-attachable conical area ratio changer and a retainer ring to hold the detachable and re-attachable conical area ratio changer.

Example 2

In this example, the gas is natural gas.

The liquid is liquid condensate and water.

The gas velocity is (Vg) is 41.4 meters per second.

The mass of liquid to mass of gas has a ratio of 1.91.

The orientation of the second hollow body is vertical.

The orientation of the first hollow body is at a 90 degree angle to the second hollow body's longitudinal axis.

Four differential pressures are measured in the two hollow bodies as well as the chamber pressure.

Chamber pressure is used to compute gas density.

The first hollow body conical section differential pressure is measured to equal 60,250 millibars across the conical section.

The ram velocity port with ram velocity sensor in the first hollow body is measured to read 43,157 millibars.

The second hollow body has a differential pressure reading from the second conical section of 65,000 millibars.

The second ram velocity port with second ram velocity sensor is reading 37,760 millibars.

A complex mechanistic regression is performing using the lowest apparent velocity detected by the ram velocity sensors from both hollow bodies. The 37,760 millibar is used in this example as initial gas content which is computed using the formulate (velocity×area of the chamber)×density of the gas.

Both conical section differential pressure readings are compared to each other and the difference between the differential pressures is calculated.

The computed difference in differential pressure is converted into a liquid mass using a Dynamics Flow Computer proprietary algorithm.

The apparent gas will be computed for the discovered liquid content.

A corrected gas content is used to perform another calculation.

The discovered liquid content by comparing the horizontal and vertical conical section differential pressures While these embodiments have been described with emphasis on the embodiments, it should be understood that within the scope of the appended claims, the embodiments might be practiced other than as specifically described herein.

What is claimed is:

1. A wet gas measuring system for calculating mass and volume of a gas and a liquid independently and simultaneously, comprising:
   a. a first hollow body comprising:
      (i) a first chamber longitudinally disposed in the first hollow body;
      (ii) a first conical section mount centrally mounted in the first chamber interrupting the flow of a mixture of gas and liquid through the first hollow body,
      (iii) a first conical area ratio changer fluidly engaging the first conical section mount conditioning the gas to a uniform geometric shape in the first chamber;
      (iv) a first protruding dome formed on the first conical section mount upstream of the first conical area ratio changer;
      (v) a first ram inlet bore in the first protruding dome wherein the first ram inlet bore is unaffected by changes in gas viscosity, changes in Reynolds' number, changes in gas and liquid turbulence, and the first ram inlet bore is solely affected by velocity of the gas and density of the gas;
   b. a first upstream static pressure sensor mounted in a first static upstream pressure port of the first hollow body for detecting pressure of the gas and liquid;
   c. a first downstream pressure sensor mounted in a first downstream pressure port of the first chamber or mounted in a first downstream pressure port centrally positioned in the first conical section for detecting a differential pressure across the conical section generated by the combined gas and liquid;
   d. a first temperature sensor extending into a first temperature port of the first hollow body detecting temperature of the gas and liquid in the first chamber;
   e. a first ram velocity sensor mounted in a ram velocity port for measuring pressure created by velocity of the gas at a center of the first chamber and calculating velocity and mass of the gas in the first chamber;
   f. a first detachable and re-attachable conical area ratio changer fluidly communicating with the downstream pressure port configured to provide a preset area for gas and liquid to flow through creating a differential pressure across the first conical section while conditioning gas flow through the first chamber; and
   g. a first gas flow processor and a first liquid and gas flow processor with memory in communication with the first upstream static pressure sensor, the first downstream pressure sensor, first temperature sensor, the first ram velocity sensor and uses:
      (i) computer instruction in the memory that instruct the first gas flow processor to calculate a flow rate of gas present in a center of the first hollow body;
      (ii) computer instructions in the memory that instruct the first liquid and gas flow processor to calculate a flow rate across the first conical section of the mixture of gas and liquid in the first chamber and simultaneously calculate mass and volume of the mixture of gas and the liquid flowing through the first hollow body;
      (iii) computer instructions in the memory that instruct the first liquid and gas flow processor to subtract mass and volume of the gas from the mass and volume of the mixture of gas and liquid in the first hollow body; and
      (iv) computer instructions in the memory that instruct the first liquid and gas flow processor to perform a regression analysis to remove mass and volume of the liquid from the mass and volume of the mixture of gas and liquid.

2. The system of claim 1, comprising:
   a. a blind T 22 connected directly to the outlet of the first hollow body to stop measured fluid flow and redirect the measured fluid flow at an angle from 0 to 120 degrees and reset a flow pattern of the gas and liquids;
   b. a second hollow body comprising:
      (i) a second chamber longitudinally disposed in the second hollow body;
      (ii) a second conical section mount centrally mounted in the second chamber interrupting the flow of a mixture of gas and liquid through the second hollow body,
      (iii) a second conical area ratio changer fluidly engaging the second conical section mount conditioning the gas to a uniform geometric shape in the second chamber;
      (iv) a second protruding dome formed on the second conical section mount upstream of the second conical area ratio changer;
      (v) a second ram inlet bore in the second protruding dome wherein the second ram inlet bore is unaffected by changes in gas viscosity, changes in Reynolds' number, changes in gas and liquid turbulence, and the second ram inlet bore is affected solely by velocity of the gas and density of the gas;
   c. a second upstream static pressure sensor, supported by a second upstream pressure tab, mounted in a static upstream pressure port of the second hollow body for detecting pressure of the gas and liquid;
   d. a second downstream pressure sensor, supported by a second downstream pressure tab, mounted in a downstream pressure port of the second chamber or mounted in a downstream pressure port centrally positioned in the second conical section for detecting a differential pressure across the conical section generated by the combined gas and liquid;
   e. a second temperature sensor, supported by a second temperature tab, extending into a temperature port of the second hollow body detecting temperature of the gas and liquid in the second chamber;
   f. a second ram velocity sensor, supported by a second ram velocity tab, mounted in a ram velocity port for measuring pressure created by velocity of the gas at a center of the second chamber and calculating velocity and mass of the gas in the second chamber;
   g. a second detachable and re-attachable conical area ratio changer fluidly communicating with the downstream pressure port configured to provide a preset area for gas and liquid to flow through creating a differential pressure across the second conical section while conditioning gas flow through the second chamber, wherein the second hollow body receives the liquid and gas from the blind T 22, transferring the liquid and gas vertically upward from the blind T 22 against gravity at an angle from 0 degrees to 90 degrees and all the numbers in between to the first hollow body; and
   h. a second gas flow processor and a second liquid and gas flow processor with the memory in communication with the second upstream static pressure sensor, the second downstream pressure sensor, the second temperature sensor, and the second ram velocity sensor.

3. The system of claim 2, wherein each upstream static pressure sensor extends into the hollow body upstream of each conical section.

4. The system of claim 2, wherein the combination of a temperature sensor and a temperature port extends into each conical section to detect temperature of the hollow body.

5. The system of claim 2, wherein each detachable and re-attachable conical area ratio changer is mounted to the conical section of a hollow body, and comprises a central bore fluidly communicating with the upstream pressure port.

6. The system of claim 2, wherein each gas flow processor each liquid and gas flow processor are in a wireless communication with sensors in both hollow bodies via a network for further communication with a client device.

7. The system of claim 6, wherein the memory comprises:
   a. computer instructions in the memory that instruct the second gas flow processor to calculate a flow rate of gas present in a center of the second hollow body;
   b. computer instructions in the memory that instruct the second liquid and gas flow processor to calculate a flow rate across the second conical section of the mixture of gas and liquid in the second chamber and simultaneously calculate mass and volume of the mixture of gas and the liquid flowing through the second hollow body;
   c. computer instructions in the memory that instruct the second liquid and gas flow processor to subtract mass and volume of the gas from the mass and volume of the mixture of gas and liquid in the second hollow body;
   d. computer instructions in the memory that instruct the second liquid and gas flow processor to perform a regression analysis to remove mass and volume of the liquid from the mass and volume of the mixture of gas and liquid.

8. The wet gas measuring system of claim 2, wherein each hollow body is substantially cylindrical, and wherein the conical section mount is machine centered into each chamber, and wherein a bore is machine centered through each conical section mount.

9. The wet gas measuring system of claim 2, wherein each detachable and re-attachable conical area ratio changer is a substantially frustoconical annular disc comprising a flat surface to reduce wear of the detachable and re-attachable conical area ratio changer and promote unhindered fluid flow.

10. The wet gas measuring system of claim 2, wherein each detachable and re-attachable conical area ratio changer is variable in size to be larger or smaller, to accommodate variations in fluid flow velocity while maintaining accuracy.

11. The wet gas measuring system of claim 2, wherein each hollow body and conical section mount are an integral single piece of cast metal.

12. The wet gas measuring system of claim 2, comprising a plurality of tabs, wherein each tab of the plurality of tabs is mounted in at least one port, wherein the plurality of tabs comprise a temperature tab mounted in each temperature port, a downstream pressure tab mounted in each downstream pressure ports, a ram velocity tab mounted in each ram velocity port, an upstream pressure tab mounted in each static upstream pressure port, and further wherein each tab of the plurality of tabs secures to and centers at a sensor in at a port.

13. The wet gas measuring system of claim 12, wherein each tab of the plurality of tabs has a head portion with a tab bore for receiving the at least one sensor formed through the head portion, a shaft portion, threads formed on the shaft portion, a neck section connected between the shaft portion and the head portion, and an angled surface between the neck section and the head portion, the angled surface for supporting a weld connecting each tab of the plurality of tabs to one of the hollow bodies.

14. The wet gas measuring system of claim 2, further comprising a plurality of lock washers, each lock washer securing a hollow fastener to one of the detachable and re-attachable conical area ratio changers and a plurality of retainer rings, each retainer ring constraining one of the detachable and re-attachable conical area ratio changers.

15. The wet gas measuring system of claim 2, further comprising a plurality of seals disposed between each detachable and re-attachable conical area ratio changer and each conical section of each hollow body.

* * * * *